US012319896B2

(12) United States Patent
Lee et al.

(10) Patent No.: US 12,319,896 B2
(45) Date of Patent: Jun. 3, 2025

(54) LIQUID CARBON DIOXIDE-BASED CLEANING COMPOSITION COMPRISING AN ORGANIC SOLVENT-BASED DETERGENT ADDITIVE

(71) Applicant: LG Electronics Inc., Seoul (KR)

(72) Inventors: Jongseok Lee, Seoul (KR); Hee Yeon Kim, Seoul (KR); Myunghun Im, Seoul (KR)

(73) Assignee: LG Electronics Inc., Seoul (KR)

( * ) Notice: Subject to any disclaimer, the term of this patent is extended or adjusted under 35 U.S.C. 154(b) by 691 days.

(21) Appl. No.: 17/563,341

(22) Filed: Dec. 28, 2021

(65) Prior Publication Data

US 2022/0204891 A1 Jun. 30, 2022

(30) Foreign Application Priority Data

Dec. 28, 2020 (KR) ........................ 10-2020-0185349

(51) Int. Cl.

*C11D 7/30* (2006.01)
*C11D 1/72* (2006.01)
*C11D 3/20* (2006.01)
*C11D 3/43* (2006.01)

(52) U.S. Cl.

CPC .................. *C11D 3/43* (2013.01); *C11D 1/72* (2013.01); *C11D 3/2093* (2013.01); *C11D 2111/12* (2024.01)

(58) Field of Classification Search

CPC .... C11D 1/72; C11D 7/30; C11D 7/50; C11D 7/5004; C11D 7/5018; C11D 7/504; B08B 7/0021

See application file for complete search history.

(56) References Cited

U.S. PATENT DOCUMENTS

| | | | | |
|---|---|---|---|---|
| 5,858,022 | A | 1/1999 | Romack et al. | |
| 6,148,645 | A | 11/2000 | DeYoung et al. | |
| 6,200,352 | B1 | 3/2001 | Romack et al. | |
| 6,218,353 | B1 | 4/2001 | Romack et al. | |
| 6,258,766 | B1 | 7/2001 | Romack et al. | |
| 6,454,869 | B1 * | 9/2002 | Cotte | C11D 3/245 134/36 |
| 6,499,322 | B1 | 12/2002 | DeYoung et al. | |
| 6,711,773 | B2 | 3/2004 | DeYoung et al. | |
| 6,846,790 | B2 | 1/2005 | Evers et al. | |
| 11,078,448 | B2 | 8/2021 | Kim et al. | |
| 2002/0194681 | A1 | 12/2002 | DeYoung et al. | |
| 2003/0097718 | A1 | 5/2003 | Evers et al. | |
| 2008/0000505 | A1 * | 1/2008 | McDermott | B08B 3/12 134/105 |
| 2019/0345417 | A1 | 11/2019 | Kim et al. | |

FOREIGN PATENT DOCUMENTS

| | | |
|---|---|---|
| CN | 107858215 | 3/2018 |
| JP | H06212195 | 8/1994 |
| JP | 2001514337 | 9/2001 |
| JP | 2005082767 | 3/2005 |
| KR | 20070102867 | 10/2007 |
| KR | 20180081995 | 7/2018 |
| WO | WO2000070141 | 11/2000 |

OTHER PUBLICATIONS

Extended European Search Report in European Appln. No. 21217805.7, dated May 19, 2022, 7 pages.

International Search Report in International Appln. No. PCT/KR2021/019979, dated Apr. 11, 2022, 3 pages.

* cited by examiner

*Primary Examiner* — Charles I Boyer

(74) *Attorney, Agent, or Firm* — Fish & Richardson P.C.

(57) ABSTRACT

A liquid carbon dioxide base cleaning detergent composition includes: an organic solvent represented by chemical formula 1, and a contaminant remover, where the chemical formula 1 is $R_1—(CH_2)_m(CF_2)_n—R_2$, m refers to integers from 0 to 4, n refers to integers from 1 to 5, $R_1$ and $R_2$ refer to hydrogen H, fluorine F, $CH_3$, $CH_3O$ or $CF_3$.

9 Claims, No Drawings

LIQUID CARBON DIOXIDE-BASED CLEANING COMPOSITION COMPRISING AN ORGANIC SOLVENT-BASED DETERGENT ADDITIVE

CROSS-REFERENCE TO RELATED APPLICATION

This application claims priority to and the benefit of Korean Patent Application No. 10-2020-0185349, filed on Dec. 28, 2020, the disclosure of which is incorporated herein by reference in its entirety.

TECHNICAL FIELD

The present disclosure relates to a detergent composition excellent in usability for liquid carbon dioxide base cleaning.

BACKGROUND

Generally, washing that is a process for eliminating dirt or contaminants from textile or clothes may be divided into two categories.

In a first washing method, a surfactant may be dissolved in water and the alkalinity of water may increase to remove dirt or contaminants from textile or clothes. Hence, the fabric or clothes may be rinsed, and dehydrated and dried. That is a normal washing method and usually uses a laundry detergent.

In a second washing method, water may be used such that the alkaline washing conditions and a physical force of a washing machine operated for a preset time period may be used. The second washing method may remove oily contaminants from fabric (e.g., wool, silk and other natural protein fiber, artificial silk fiber and acetate fiber) by means of petroleum-based, chlorine-based, glycol ester-based, cyclic silicone, silicone-based fluorine-based, terpene oil-based such as limonene (hereinafter, 'solvent'). Here, the fabric may be fiber that generates deformation in a surface and inside to lose luster, and deformation such as contraction or relaxation. Hence, the second method may remove the solvent from the clothes or fabric based on a physical method and dry them to volatilize the solvent. The second washing method may refer to "dry cleaning."

The first washing method using a typical laundry detergent may require much water. Because of that, the first washing method has an excellent effect in removing watery contaminants but also has a limit to the removal of oily contaminants. In addition, fabric surface and fiber inside may be deformed by the alkaline washing conditions and long-term contact with water. Accordingly, luster of fibers could be lost and contraction or relaxation of fibers could occur disadvantageously.

Recently, neutral liquid detergents are commercially available to reduce damages or deformation to the clothing that are caused by detergent bases. However, such neutral liquid detergents are also used by diluting in water and still have a disadvantage in that the deformation by means of water cannot be alleviated.

Next, the dry cleaning method has an excellent effect in removing oily contaminants. However, the dry cleaning uses substances that are categorized into the ones harmful to human body and environment or raw materials with poor flammability and poor polymer stability. Because of that, the raw materials used in the dry cleaning might cause malfunction of washing equipment and a fire.

Accordingly, research has begun to develop safer, eco-friendly, and energy-efficient laundry cleaning than the conventional washing and dry cleaning.

A cleaning method using liquid carbon dioxide instead of various chemical raw materials used in the conventional washing in water and dry cleaning has been introduced, as laundry cleaning method having eco-friendly and energy-efficient effect. Compared with the washing in water and dry cleaning, the washing method using the liquid carbon dioxide may be relatively harmless to human body and environment. In addition, low temperature washing may be possible in the liquid carbon dioxide and energy efficiency may be quite high. As the liquid carbon dioxide can be recycled after the washing process, laundry turnover may be increased advantageously.

The liquid carbon dioxide-base cleaning may wash, rinse, and dry various types of clothes by means of phase change characteristics between gas and liquid of carbon dioxide quickly and without damage, and remove contaminant remnants from the clothes. In the liquid carbon-base cleaning, liquid carbon dioxide may wash and rinse clothes at high pressure. Liquid carbon dioxide contained in the laundry may be vaporized quickly at low pressure and removed from the laundry. Accordingly, the liquid carbon dioxide-base cleaning may be a cleaning method that needs no drying process.

The liquid carbon dioxide-base cleaning mentioned above has several advantages but also have disadvantages related to insufficient cleaning power. That is because only liquid carbon dioxide-base cleaning fails to remove diverse contaminants (e.g., water-based or oil-based organic pollutants and inorganic contaminants).

Research on detergents suitable for the liquid carbon dioxide-base cleaning is currently ongoing.

First of all, laundry detergents applied to washing in water may not be dissolved in liquid carbon dioxide such that it cannot be suitable for the liquid carbon dioxide-base cleaning.

Accordingly, there was an attempt to apply surfactants to the laundry detergent to dissolve the laundry detergent for washing in water to the liquid carbon dioxide. A conventional liquid carbon dioxide base cleaning discloses that Fluorine-based surfactants is used in detergent composition for liquid carbon dioxide base cleaning. Even when such Fluorine-based surfactants are used, laundry detergent is not dissolved in carbon dioxide sufficiently and a laundry washing power for water-based contaminants is not satisfactory.

In addition, a conventional liquid carbon dioxide base cleaning uses additives such as Ethylene glycol so as to reinforce and improve such insufficient laundry cleaning power. However, the laundry cleaning power is slightly improved.

The conventional liquid carbon dioxide base cleaning described above demands a connection medium that reacts carbon dioxide and surfactants. However, a solution that can react carbon dioxide and surfactants with each other has not been introduced.

SUMMARY

The present disclosure is directed to a liquid carbon dioxide base cleaning detergent composition having a new system.

The present disclosure is also directed to a new liquid carbon dioxide base detergent composition having an excellent cleaning efficiency for water-based contaminants as well as oil-based contaminants.

The present disclosure is also directed to a new liquid carbon dioxide base cleaning detergent composition that has good friendliness with a non-polar solvent such as liquid carbon dioxide and water-based and oil-based contaminants removing substances so as to dissolve those contaminants removing substances in the liquid carbon dioxide easily.

The present disclosure is also directed to a new liquid carbon dioxide base cleaning composition that is safe for human body and environment, and eco-friendly with no flammability.

According to one aspect of the subject matter described in this application, a liquid carbon dioxide base cleaning detergent composition can include an organic solvent represented by chemical formula 1, and a contaminant remover. The chemical formula 1 can be $R_1$—$(CH_2)_m(CF_2)_n$—$R_2$, where m refers to integers from 0 to 4, n refers to integers from 1 to 5, $R_1$ and $R_2$ refer to hydrogen H, fluorine F, $CH_3$, $CH_3O$ or $CF_3$.

Implementations according to this aspect can include one or more of the following features. For example, the organic solvent can include one or more of perfluoroheptane (PFH, $CH_3(CF_2)_5CF_3$), pentafluorobutane PFB, $CF_3CH_2CF_2CH_3$), decafluoropentane (DFP, $CF_3(CFH)_2CF_2CF_3$ and methoxy nonafluorobutane (MNF $CH_3O(CF_2)_2CF_3$).

In some implementations, the contaminant remover can include an oil-based contaminant remover, and a water-based contaminant remover. In some examples, the oil-based contaminant remover can be represented by chemical formula 2. The chemical formula 2 can be $R_3$—O—(CO)—O—$R_4$, where $R_3$ and $R_4$ refer to 1-4 alkyl group.

In some examples, the oil-based contaminant remover can include one or more of dimethyl carbonate, diethyl carbonate, dipropyl carbonate, or dibutyl carbonate. In some implementations, the water-based contaminant remover can be represented by chemical formula 3. The chemical formula 3 can be $C_mH_{2m+1}$—O—$(CH_2CH_2O)_n$—H, where m refers to integers from 5 to 21, and n refers to integers from 1 to 10.

In some examples, the water-based contaminant remover can include one or more of polyoxy ethylene dodecanyl ether, polyoxy ethalene tetra decanyl ether, polyoxy hexadecanyl ether, or polyoxy ethylene hepta decanyl ether. In some implementations, the liquid carbon dioxide base cleaning detergent composition can further include 80 to 99 wt % of the organic solvent, and 1 to 20 wt % of the contaminant remover.

In some implementations, the liquid carbon dioxide base cleaning detergent composition can further include 80 to 90 wt % of the organic solvent, 1 to 10 wt % of the oil-based contaminant remover, and 1 to 10 wt % of the water-based contaminant remover.

DETAILED DESCRIPTION

The present disclosure relates to detergent composition having excellent usability for high-pressure liquid carbon dioxide cleaning, more particularly, to liquid carbon dioxide base cleaning detergent composition that can have excellent solubility of detergent ingredients in liquid carbon dioxide enough to efficiently remove both oil-based contaminants and water-based contaminants.

The liquid carbon dioxide base cleaning detergent composition can include an organic solvent represented by following Chemical Formula 1, and a contaminant remover.

The organic solvent provided in the liquid carbon dioxide base cleaning detergent composition will be described below. The liquid carbon dioxide base cleaning detergent composition can include an organic solvent that is used in efficiently dissolving a contaminant remover, without phase-change of liquid carbon dioxide that might occur by pressure decrease in a tub. The organic solvent can be a fluorine solvent and represented by following Chemical Formula 1:

$$R_1—(CH_2)_m(CF_2)_n—R_2 \qquad \text{[Chemical Formula 1]}$$

In Chemical formula 1, 'm' refers to 0-4 integers and 'n' refers to 1-5 integers. '$R_1$' and '$R_2$' refer to hydrogen H, fluorine F, $CH_3$, $CH_3O$ or $CF_3$. '$R_1$' and '$R_2$' can be equal to or different from each other.

The Fluorine-base organic solvent can have excellent friendliness with discursive polar and non-polar solvents and excellent mixing force with liquid carbon dioxide that is provided as a non-polar solvent in the tub. In addition, the fluorine-base organic solvent can have excellent friendliness with organic solvents such as fiber-based, chlorine-based, cyclic silicone or silicone-based, fluorine-based, terpene oil-based organic solvents, and anionic and cationic surfactants or water-soluble raw materials.

Accordingly, fluorine-base organic solvent can be provided to maintain a homogeneous phase of a raw material when the non-polar liquid carbon dioxide solvent is mixed with the contaminant remover.

Specifically, the fluorine-base organic solvent can include one or more of the groups that include perfluoroheptane (PFH, $CH_3(CF_2)_5CF_3$), pentafluorobutane (PFB, $CF_3CH_2CF_2CH_3$), decafluoropentane (DFP, $CF_3(CFH)_2CF_2CF_3$) and methoxy nonafluorobutane (MNF, $CH_3O(CF_2)_2CF_3$). The present disclosure may not be limited thereto.

The contaminant remover provided in the liquid carbon dioxide base cleaning detergent composition will be described below.

The composition can include the contaminant remover having excellent friendliness with the organic solvent. Specifically, the composition can include an oil-based contaminant remover and a water-based contaminant remover.

The water-based contaminant remover can include a compound that may be represented by following Chemical formula 2:

$$R_3—O—(CO)—O—R_4 \qquad \text{[Chemical formula 2]}$$

In Chemical formula 2, '$R_3$' and '$R_4$' refer to 1-4 alkyl groups. '$R_3$' and '$R_4$' can be equal to or different from each other.

The contaminant remover provided in the composition will be described below.

Specifically, the oil-based contaminant remover can include one or more of the groups that include dimethyl carbonate, diethyl carbonate, dipropyl carbonate, and dibutyl carbonate. The present disclosure may not be limited thereto.

Next, the water-based contaminant remover can include a compound that is represented by following Chemical formula 3:

$$C_mH_{2m+1}—O—(CH_2CH_2O)_n—H \qquad \text{[Chemical formula 3]}$$

In Chemical formula 3, 'm' refers to 5-21 integers and 'n' refers to 1-10 integers.

Specifically, the water-based contaminant remover can include one or more of the groups including polyoxy ethylene dodecanyl ether, polyoxy ethalene tetra decanyl ether, polyoxy hexadecanyl ether and polyoxy ethylene hepta decanyl ether. The present disclosure may not be limited thereto.

The liquid carbon dioxide cleaning detergent composition will be described below.

The liquid carbon dioxide cleaning detergent composition can include 80 to 99 wt % of the organic solvent and 1 to 20 wt % of the contaminant remover.

Specifically, the contaminant remover can include 1 to 10 wt % of the oil-based contaminant remover and 1 to 10 wt % of the water-based contaminant remover, based on 100 wt % of the composition.

In some implementations, the organic solvent can include an amount of 80 to 90 wt % (by weight) in the liquid carbon dioxide-base cleaning detergent composition.

When the content of the organic solvent in the composition is less than 80 wt %, there may be a problem in maintaining a uniform phase because the additive raw materials such as the contaminant remover are not sufficiently mixed.

Next, the oil-based contaminant remover can be included in the composition in an amount of 1 to 10 wt %. If the content of the oil-based contaminant remover in the composition is less than 1 wt %, there may be a problem in that the oil-based contaminant removal of the fiber is lowered, and if it exceeds 10 wt %, there may be problems such as phase separation during the preparation of the composition.

Next, the water-based contaminant remover can be included in the composition in an amount of 1 to 10 wt %. If the content of the water-based contaminant remover in the composition is less than 1 wt %, there may be a problem in that the water-based contaminant removing power from the fiber is lowered, and if it exceeds 10% by weight, the remover may remain on the surface of the fiber when drying after washing and there may be a problem that stains may occur.

In some implementations, it is preferable to contain 5 to 15% by weight in the liquid carbon dioxide of the liquid carbon dioxide base cleaning detergent composition described above. If the detergent composition is less than 5% by weight based on 100% by weight of the total amount of the detergent composition and the liquid carbon dioxide, the detergent content in the liquid carbon dioxide may be insufficient, thereby reducing oil-based and water-based stain removal power. In addition, when the detergent composition exceeds 15% by weight, there may be a problem in that the raw material used for the detergent remains on the surface of the fiber during drying after washing, resulting in stains.

Hereinafter, one exemplary implementations of the present disclosure will be described in detail.

1. Preparation of One Exemplary Implementation and One Compared Example:

A liquid carbon dioxide base cleaning detergent composition was prepared by adding an oil-based contaminant remover and a water-based contaminant remover to an organic solvent and stirring until a transparent liquid was obtained at room temperature.

The components and compositions of the organic solvent, the contaminant remover, and the water-based contaminant remover are shown in Table 1 below.

TABLE 1

| | Organic solvent (wt %) | | | | Oil-based contaminant remover (wt %) | | | | Water-based contaminant remover (wt %) | | | |
|---|---|---|---|---|---|---|---|---|---|---|---|---|
| Category | A1 | A2 | A3 | A4 | B1 | B2 | B3 | B4 | C1 | C2 | C3 | C4 |
| Implementation 1 | 89 | | | | 1 | | | | 10 | | | |
| Implementation 2 | 85 | | | | | 5 | | | 10 | | | |
| Implementation 3 | | 80 | | | 10 | | | | 10 | | | |
| Implementation 4 | | | 89 | | | 10 | | | 1 | | | |
| Implementation 5 | | 90 | | | 5 | | | | 5 | | | |
| Implementation 6 | 89.5 | | | | 0.5 | | | | 10 | | | |
| Implementation 7 | | 89.5 | | | | 10 | | | 0.5 | | | |
| Implementation 8 | | | 75 | | 10 | | | | 15 | | | |
| Implementation 9 | | | | 89 | | | 1 | | | 10 | | |
| Implementation 10 | | | | 85 | | | | 5 | | 10 | | |
| Implementation 11 | | | | 80 | | | 10 | | | 10 | | |
| Implementation 12 | | | | 89 | | | | 10 | | 1 | | |
| Implementation 13 | | | | 90 | | | 5 | | | 5 | | |
| Implementation 14 | | | | 89.5 | | | 0.5 | | | 10 | | |
| Implementation 15 | | | | 89.5 | | | | 10 | | 0.5 | | |
| Implementation 16 | | | | 75 | | | 10 | | | 15 | | |
| Implementation 17 | 89 | | | | 1 | | | | | | 10 | |
| Implementation 18 | 85 | | | | | 5 | | | | | 10 | |
| Implementation 19 | | 80 | | | 10 | | | | | | 10 | |
| Implementation 20 | | | 89 | | | 10 | | | | | 1 | |
| Implementation 21 | | 90 | | | 5 | | | | | | 5 | |
| Implementation 22 | 89.5 | | | | 0.5 | | | | | | 10 | |
| Implementation 23 | | 89.5 | | | | 10 | | | | | 0.5 | |
| Implementation 24 | | | 75 | | 10 | | | | | | 15 | |
| Implementation 25 | | 89 | | | | 1 | | | | | | 10 |
| Implementation 26 | | 85 | | | | | 5 | | | | | 10 |
| Implementation 27 | | | 80 | | | 10 | | | | | | 10 |
| Implementation 28 | | | | 89 | | | 10 | | | | | 1 |
| Implementation 29 | | | 90 | | | 5 | | | | | | 5 |
| Implementation 30 | | 89.5 | | | | 0.5 | | | | | | 10 |

TABLE 1-continued

| Category | Organic solvent (wt %) | | | | Oil-based contaminant remover (wt %) | | | | Water-based contaminant remover (wt %) | | | |
|---|---|---|---|---|---|---|---|---|---|---|---|---|
| | A1 | A2 | A3 | A4 | B1 | B2 | B3 | B4 | C1 | C2 | C3 | C4 |
| Implementation 31 | | | 89.5 | | | | 10 | | | | | 0.5 |
| Implementation 32 | | | | 75 | | 10 | | | | | | 15 |

A1: pentafluorobutane
A2: perfluoroheptane
A3: decafluoropentane
A4: methoxy nonafluorobutane
B1: perdimethyl carbonate
B2: diethyl carbonate
B3: dipropyl carbonate
B4: dibutyl carbonate
C1: polyoxyethylene dodecyl ether EO 7 molar adduct
C2: polyoxy ethalene tetradecanyl ether
C3: polyoxy hexadecanyl ether
C4: polyoxyethylene hepta decanyl ether
Comparative Example 1: Electrolux detergent composition
Comparative Example 2: Professional wet cleaning
Comparative Example 3: Professional dry cleaning 2. Washing Performance Evaluation A specimen (cotton/poly 50:50) was prepared, and immerse the specimen in water-based contamination by dissolving 10 g of mixed coffee in 100 mL of hot water and oil-based contamination, which is a common automobile transmission oil, respectively. After that, a stained cloth was prepared by drying at 60° C. for 2 hours 30 minutes. The stained cloth was washed for 10 minutes in a liquid carbon dioxide cleaning tank in which 11 wt % of the detergent composition according to Examples and Comparative Examples was diluted.

After washing, the washing rate was calculated by observing the reflectance before and after washing with a colorimeter (Minolta CR-300 Chroma-meter). At this time, the washing rate was calculated by the formula ((Rw−Rs)/(Ro−Rs))×100(%), where Ro is the surface reflectance of the original fabric, Rs is the surface reflectance of the soiled fabric before washing, and Rw is the surface reflectance of the soiled fabric after washing. It means the surface reflectance of the contaminated cloth. The calculated wash rates are shown in Table 2 below.

In addition, after leaving each of the detergent composition stock solutions according to Examples and Comparative Examples under severe conditions (50° C. oven and −5° C. incubator, 7 days), the phase separation phenomenon and transparency of the detergent composition stock solution were visually observed and evaluated. After 7 days, the degree of suspension and separation of the detergent stock solution was evaluated as good or bad, and if the phase of the detergent stock solution was transparent without change, it was marked as excellent.

The performance evaluation and phase stability evaluation results are shown in Table 2 below.

TABLE 2

| category | Phase stability (50° C.) | Phase stability (−15° C.) | flammability | Washing rate(%) Water-based contaminant | Washing rate(%) Oil-based contaminant |
|---|---|---|---|---|---|
| Embodiment 1 | Excellent | Excellent | Excellent | >80 | >90 |
| Embodiment 2 | Excellent | Excellent | Excellent | >80 | >90 |
| Embodiment 3 | Excellent | Excellent | Excellent | >80 | >90 |
| Embodiment 4 | Excellent | Excellent | Excellent | >80 | >90 |
| Embodiment 5 | Excellent | Excellent | Excellent | >80 | >90 |
| Embodiment 6 | Excellent | Excellent | none | >80 | <60 |
| Embodiment 7 | Excellent | Excellent | none | <60 | >90 |
| Embodiment 8 | Good | Good | none | >80 | >90 |
| Embodiment 9 | Excellent | Excellent | none | >80 | >90 |
| Embodiment 10 | Excellent | Excellent | none | >80 | >90 |
| Embodiment 11 | Excellent | Excellent | none | >80 | >90 |
| Embodiment 12 | Excellent | Excellent | none | >80 | >90 |
| Embodiment 13 | Excellent | Excellent | none | >80 | >90 |
| Embodiment 14 | Excellent | Excellent | none | >80 | <60 |
| Embodiment 15 | Excellent | Excellent | none | <60 | >90 |
| Embodiment 16 | Good | Good | none | >80 | >90 |
| Embodiment 17 | Excellent | Excellent | none | >80 | >90 |
| Embodiment 18 | Excellent | Excellent | none | >80 | >90 |
| Embodiment 19 | Excellent | Excellent | none | >80 | >90 |
| Embodiment 20 | Excellent | Excellent | none | >80 | >90 |
| Embodiment 21 | Excellent | Excellent | none | >80 | >90 |
| Embodiment 22 | Excellent | Excellent | none | >80 | <60 |
| Embodiment 23 | Excellent | Excellent | none | <60 | >90 |
| Embodiment 24 | Good | Good | none | >80 | >90 |
| Embodiment 25 | Excellent | Excellent | none | >80 | >90 |
| Embodiment 26 | Excellent | Excellent | none | >80 | >90 |

TABLE 2-continued

| category | Phase stability (50° C.) | Phase stability (−15° C.) | flammability | Washing rate(%) Water-based contaminant | Oil-based contaminant |
|---|---|---|---|---|---|
| Embodiment 27 | Excellent | Excellent | none | >80 | >90 |
| Embodiment 28 | Excellent | Excellent | none | >80 | >90 |
| Embodiment 29 | Excellent | Excellent | none | >80 | >90 |
| Embodiment 30 | Excellent | Excellent | none | >80 | <60 |
| Embodiment 31 | Excellent | Excellent | none | <60 | >90 |
| Embodiment 32 | Good | Good | none | >80 | >90 |
| Comparative example 1 | Excellent | Excellent | none | <10 | <70 |
| Comparative example 2 | Excellent | Excellent | none | >90 | <10 |
| Comparative example 3 | Excellent | Excellent | none | <50 | >90 |

From the above results, it was confirmed that the liquid carbon dioxide base cleaning detergent composition of the present disclosure prepared by adding a fluorine-based solvent, a water-based contaminant remover, and an oil-based decontaminant remover can effectively remove oily and aqueous contaminants present on the fiber surface.

In addition, in Examples 6 to 8, 14 to 16, 22 to 24, and 30 to 32, it can be seen that the content ratio of the organic solvent and the contaminant remover is not appropriate, so that the cleaning performance is slightly poor compared to the other examples.

In addition, it can be seen that commercially available detergent compositions for cleaning liquid carbon dioxide have very poor ability to remove water-based contaminants.

What is claimed is:

1. A liquid carbon dioxide base cleaning detergent composition comprising:

A) liquid carbon dioxide;

B) a detergent additive composition comprising:

i) an organic solvent represented by chemical formula 1; $R_1$—$(CH_2)m(CF_2)n$-$R_2$, wherein m refers to integers from 0 to 4, n refers to integers from 1 to 5, R1 and R2 refer to hydrogen H, fluorine F, $CH_3$, $CH_3O$ or $CF_3$;

ii) an oil-based contaminant remover represented by chemical formula 2;

$R_3$—O—(CO)—O—$R_4$, wherein R3 and R4 refer to a 1-4 alkyl group; and iii) a water-based contaminant remover.

2. The liquid carbon dioxide base cleaning detergent composition of claim 1, wherein the organic solvent comprises one or more of perfluoroheptane (PFH, $CH_3(CF_2)_5CF_3$), pentafluorobutane (PFB, $CF_3CH_2CF_2CH_3$), decafluoropentane (DFP, $CF_3(CFH)_2CF_2CF_3$) or methoxy nonafluorobutane (MNF, $CH_3O(CF_2)_2CF_3$).

3. The liquid carbon dioxide base cleaning detergent composition of claim 1, wherein the oil-based contaminant remover comprise one or more of dimethyl carbonate, diethyl carbonate, dipropyl carbonate, or dibutyl carbonate.

4. A liquid carbon dioxide base cleaning detergent composition comprising:

A) liquid carbon dioxide;

B) a detergent additive composition comprising:

i) an organic solvent represented by chemical formula 1; $R_1$—$(CH_2)m(CF_2)n$-$R_2$, wherein m refers to integers from 0 to 4, n refers to integers from 1 to 5, R1 and R2 refer to hydrogen H, fluorine F, $CH_3$, $CH_3O$ or $CF_3$;

ii) an oil-based contaminant remover; and iii) a water-based contaminant remover represented by chemical formula 3;

$C_mH_{2m+1}$—O—$(CH_2CH_2O)n$-H, wherein m refers to integers from 5 to 21, and n refers to integers from 1 to 10.

5. The liquid carbon dioxide base cleaning detergent composition of claim 4, wherein the water-based contaminant remover includes one or more of polyoxy ethylene dodecanyl ether, polyoxy ethylene tetra decanyl ether, polyoxy hexadecanyl ether, or polyoxy ethylene hepta decanyl ether.

6. The liquid carbon dioxide base cleaning detergent composition of claim 1, wherein the detergent additive comprises 80 to 99 wt % of the organic solvent; and 1 to 20 wt % of the contaminant removers.

7. The liquid carbon dioxide base cleaning detergent composition of claim 1, wherein the detergent additive comprises 80 to 90 wt % of the organic solvent; 1 to 10 wt % of the oil-based contaminant remover; and 1 to 10 wt % of the water-based contaminant remover.

8. The liquid carbon dioxide base cleaning detergent composition of claim 4, wherein the detergent additive comprises 80 to 99 wt % of the organic solvent; and 1 to 20 wt % of the contaminant removers.

9. The liquid carbon dioxide base cleaning detergent composition of claim 4, wherein the detergent additive comprises 80 to 90 wt % of the organic solvent; 1 to 10 wt % of the oil-based contaminant remover; and 1 to 10 wt % of the water-based contaminant remover.

* * * * *